US012144781B1

(12) United States Patent
Wang

(10) Patent No.: US 12,144,781 B1
(45) Date of Patent: Nov. 19, 2024

(54) MASSAGE DEVICE

(71) Applicants: Dongguan Luose Electronic Technology Co., Ltd., Guangdong (CN); Shenzhen Envision Technology Innovation Co., Ltd., Guangdong (CN)

(72) Inventor: Dinghai Wang, Guangdong (CN)

(73) Assignees: Dongguan Luose Electronic Technology Co., Ltd., Dongguan (CN); Shenzhen Envision Technology Innovation Co., Ltd., Shenzhen (CN)

( * ) Notice: Subject to any disclaimer, the term of this patent is extended or adjusted under 35 U.S.C. 154(b) by 0 days.

(21) Appl. No.: 18/594,149

(22) Filed: Mar. 23, 2024

(30) Foreign Application Priority Data

Jan. 12, 2024 (CN) ........................ 202410053759.X
Jan. 12, 2024 (CN) ........................ 202420089779.8

(51) Int. Cl.
*A61H 7/00* (2006.01)

(52) U.S. Cl.
CPC ..... *A61H 7/004* (2013.01); *A61H 2201/1207* (2013.01); *A61H 2201/14* (2013.01)

(58) Field of Classification Search
CPC .......... A61H 7/004; A61H 7/002; A61H 7/00; A61H 7/005; A61H 19/00; A61H 19/30; A61H 19/34; A61H 23/00; A61H 23/006; A61H 23/02; A61H 23/0254; A61H 2201/12; A61H 2201/1207; A61H 2201/1215; A61H 2201/14
See application file for complete search history.

(56) References Cited

U.S. PATENT DOCUMENTS

| | | | | |
|---|---|---|---|---|
| 11,452,665 | B1 * | 9/2022 | Yu | A61H 9/0057 |
| 11,833,100 | B1 * | 12/2023 | Liu | A61H 9/0057 |
| 12,042,459 | B1 * | 7/2024 | Liu | A61H 19/34 |
| 2020/0281808 | A1 * | 9/2020 | Kirsten | A61H 23/04 |
| 2022/0110819 | A1 * | 4/2022 | Guo | A61H 9/0057 |
| 2022/0409470 | A1 * | 12/2022 | He | F04B 35/01 |

* cited by examiner

*Primary Examiner* — Colin W Stuart
(74) *Attorney, Agent, or Firm* — Yong Chen

(57) ABSTRACT

A massage device includes a housing, a massage sleeve having an opening, a transmission connection assembly, and a motor. The transmission connection assembly includes a guiding tube member, a piston movable axially inside the guiding tube member, an eccentric wheel, and a link component coupling the piston on a first end and with the eccentric wheel on a second end. The motor is coupled with the eccentric wheel via a gear assembly. When the massage device is in operation, the motor causes the piston to move axially inside the guiding tube member to change air pressure in the massage sleeve via the transmission connection assembly.

11 Claims, 4 Drawing Sheets

MASSAGE DEVICE

TECHNICAL FIELD

The present invention relates to the field of healthcare massage products, specifically to a massager.

BACKGROUND

With the faster pace of life in modern society, more people experience stress and physical discomfort, and are eager to seek avenues to relieve and relax their bodies. By mimicking hand massaging motion and techniques, massage devices can provide muscle relaxation and relieve fatigue, and are becoming more popular.

Studies show that massage devices can have a variety of effects, such as relieving fatigue and tension, promoting blood circulation, and facilitating the discharge of waste and toxins from the body. They can also improve the level of physical health, and help reduce muscle pain, joint pain, headaches, etc.

SUMMARY OF THE INVENTION

In one aspect of the present invention, a massage device is provided, which comprises: (a) a housing; (b) a massage sleeve having an opening; (c) a transmission connection assembly including: a guiding tube member, a piston movable axially inside the guiding tube member along a long axis, an eccentric wheel, and a link component having a first end coupled with the piston and a second end coupled with the eccentric wheel; and (d) a motor that is coupled with the eccentric wheel of the transmission connection assembly and when in operation, drives the piston to move axially inside the guiding tube member along the long axis to change air pressure in the massage sleeve via the transmission connection assembly, wherein the housing includes an opening at one end, the opening aligned with and in air communication with the opening of the massage sleeve, wherein the massage sleeve is arranged at an end of the guiding tube member of the transmission connection assembly and aligned coaxially with the guiding tube member, wherein the transmission connection assembly and the motor are received inside the housing.

In some embodiments of the massage device, an end of the piston has a cross section matching a cross-section of the lumen enclosed in the guiding tube member.

In some embodiments, the piston includes a sealing cover coupled with a bottom of a plunging tube.

In some embodiments, the link component includes an elongated shaft portion and a circular portion connected to the elongated shaft portion. The elongated shaft portion can include an opening at an end which is coupled with the piston via a positioning pin. The circular portion can be coupled with a circular protruding section of the eccentric wheel.

In some embodiments, the eccentric wheel has a substantially flat major face parallel with the long axis along which the piston is movable inside the guiding tube member.

In some embodiments, the eccentric wheel can include a bottom edge comprising a first planar tooth pattern that meshes with a second tooth pattern on a circumferential periphery of a gear of a gear assembly driven by the motor. The gear assembly can include a driving gear coupled on an output shaft of the motor, and a driven gear having the tooth pattern on a circumferential periphery, the driven gear being coupled with, and driven by, the driving gear.

In some embodiments, the motor includes an output shaft defining a shaft rotation axis which is parallel to the long axis.

DETAILED DESCRIPTION OF CERTAIN EMBODIMENTS

Figure 1:
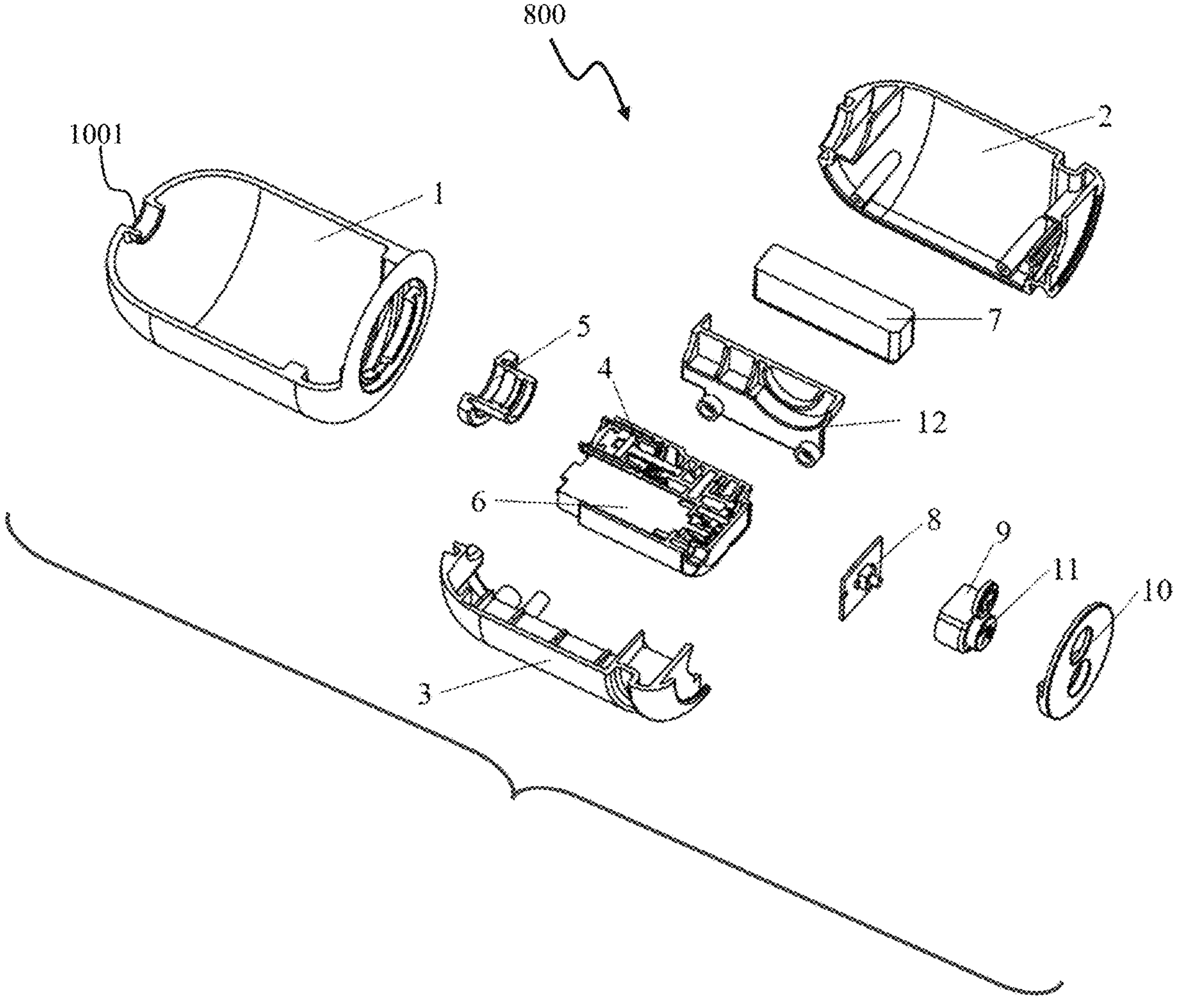
FIG. 1 is an exploded view of a massage device according to embodiments of the present invention.
Figure 2:
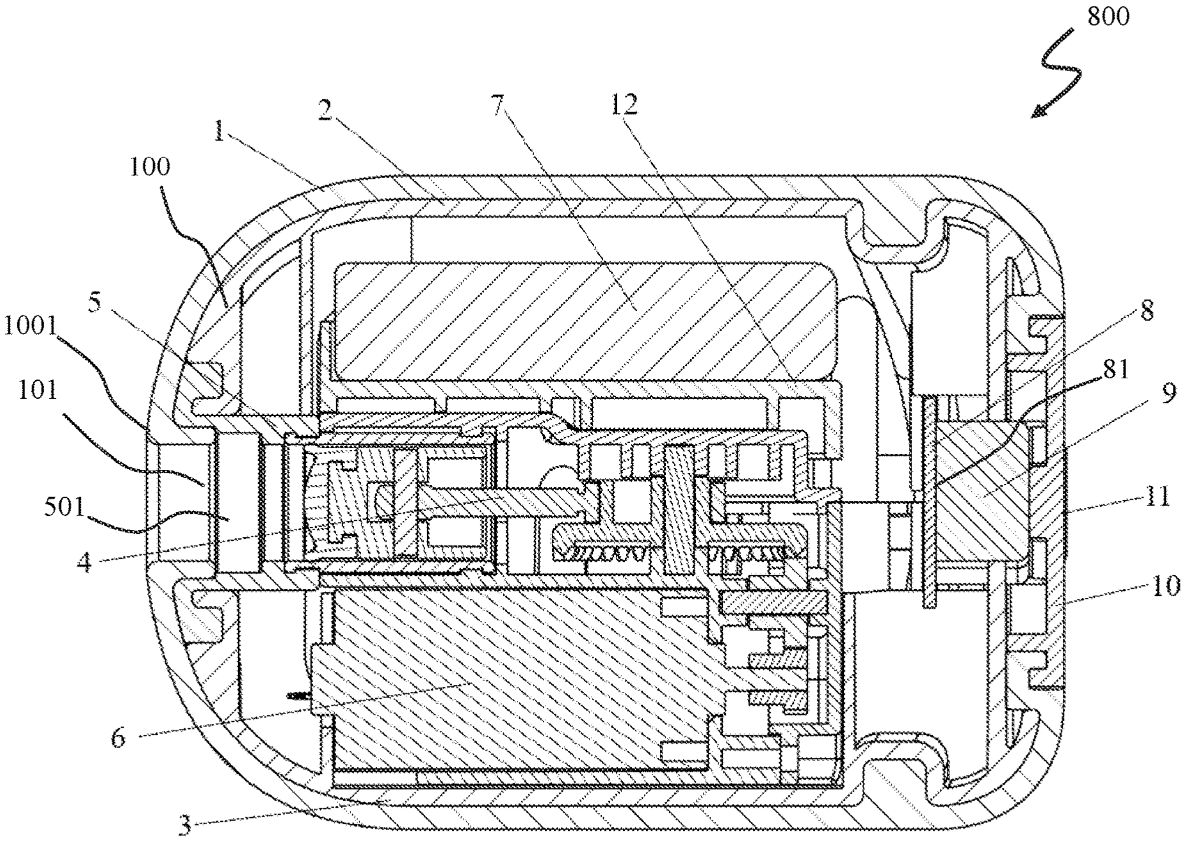
FIG. 2 is a cross-sectional structural diagram of the massage device as shown in FIG. 1.

Certain embodiments of the present invention will be described below with reference to the accompanying drawings. Elements and features described in one figure or one embodiment of the invention may be combined with elements and features shown in one or more other figures or embodiments. It should be noted that for the purpose of clarity, the representation and description of structure/components not relevant to the present invention and known to those of ordinary skill in the art have been omitted from the drawings and description herein.

Embodiments of the present invention will be further described specifically with reference to FIGS. 1-4.

As shown in FIGS. 1-4, a massage device 800 of the present invention includes: a housing 100 (including an upper casing 2 and lower casing 3 which can be closed to form an enclosure by screws or other means commonly known in the art) having an opening 101 at one end (a left end shown in FIG. 2), a massage sleeve 5, a motor 6, and a transmission connection assembly 4. The transmission connection assembly 4 includes a guiding tube member 405, a piston 412, a link component 411, and an eccentric wheel 404. The piston 412 is movable axially inside the guiding tube member 405 along a long axis X1, and is connected to the link component 411. The link component 411 is in turn connected to the eccentric wheel 404, which is coupled with the motor 6 via a gear assembly 420.

In more detail, the link component 411 includes two integrally formed parts, an elongated shaft portion 411*s* having a first end 411*a*, and a circular or ring portion 411*r* at a second end 411*b*. The ring portion 411*r* concentrically engages, via its inner face, with a top protruding circular portion 410 of the eccentric wheel 404 and can freely rotate about the protruding circular portion 410 along an axis Y1 defined by an axial direction of the rotation shaft 408 of the eccentric wheel (which is perpendicular to the long axis X1). The elongated shaft portion 411*s* comprises an opening 4110 at the end 411*a*, and the opening 4110 is coupled with the piston 412 via a positioning pin 413, which is embedded in an internal void of the piston 412. The positioning pin 413 defines an axial axis Y2 (which is parallel to the axis Y1), about which the elongated shaft portion 411*s* can rotate.

As the protruding circular portion 410 of the eccentric wheel 404 is not concentrically distributed around the shaft 408, its rotation about the shaft 408 produces a crankshaft motion for the elongated shaft portion 411*s* of the link component 411, thereby driving the piston 412 to move inside the guiding tube member 405 axially back and forth along the long axis X1 due to the restriction of its movement by the guiding tube member 405 along this axial direction.

This is similar to how a piston is driven to move in a cylinder in an internal combustion engine.

The massage sleeve 5 can generally take the form of a hollow tube with open ends. As shown in the figures, it can have an opening 501 and be positioned at and concentrically coupled with an end 4051 of the guiding tube member 405. The massage sleeve 5 is further coupled with the end opening 101 of the housing 100. The opening 501 of the massage sleeve 5 is aligned and in air communication with the end opening 101 of the housing.

The fitting between the piston 412 and the inner wall surface of the guiding tube member 405 can be airtight while allowing smooth reciprocal sliding movement of the piston 412 within the guiding tube member 405. An end 4124 of the piston 412 can have a cross section matching the cross-section of the lumen 4055 defined inside the guiding tube member 405. The piston 412 can be integrally formed as a one-piece structure, or can include two parts fitted together as shown, including a sealing cover 4122 coupled with a bottom portion **4121*b* of a plunging tube 4121 which includes the bottom portion 4121*b* as well as a hollow cylinder portion 4121*w* extending from the bottom portion 4121*b*. The sealing cover 4122 slidably engages with the interior wall of the guiding tube member 405, and can be made with rubbery or elastic material, for providing an airtight seal with the inner wall surface of the guiding tube member 405**.

Figure 3:
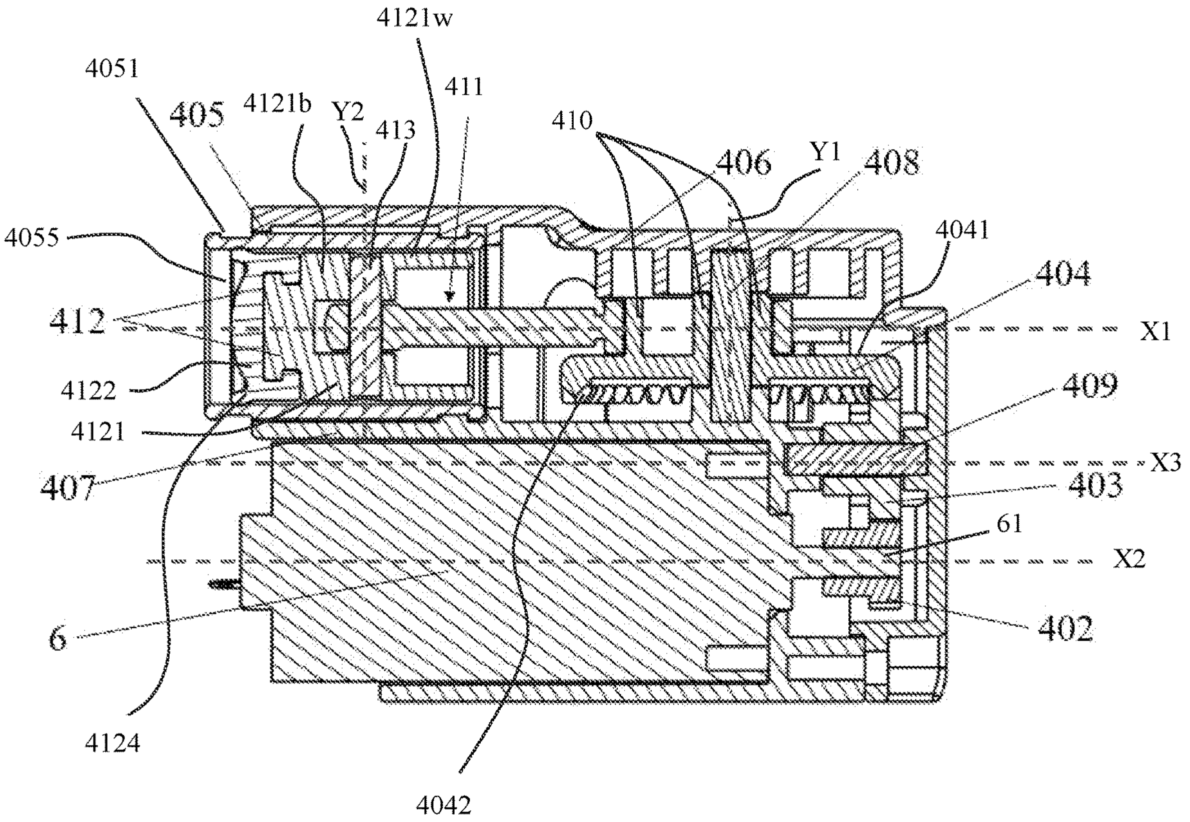
FIG. 3 is an enlarged cross-sectional structural diagram of a part of the massage device as shown in FIG. 2.
Figure 4:
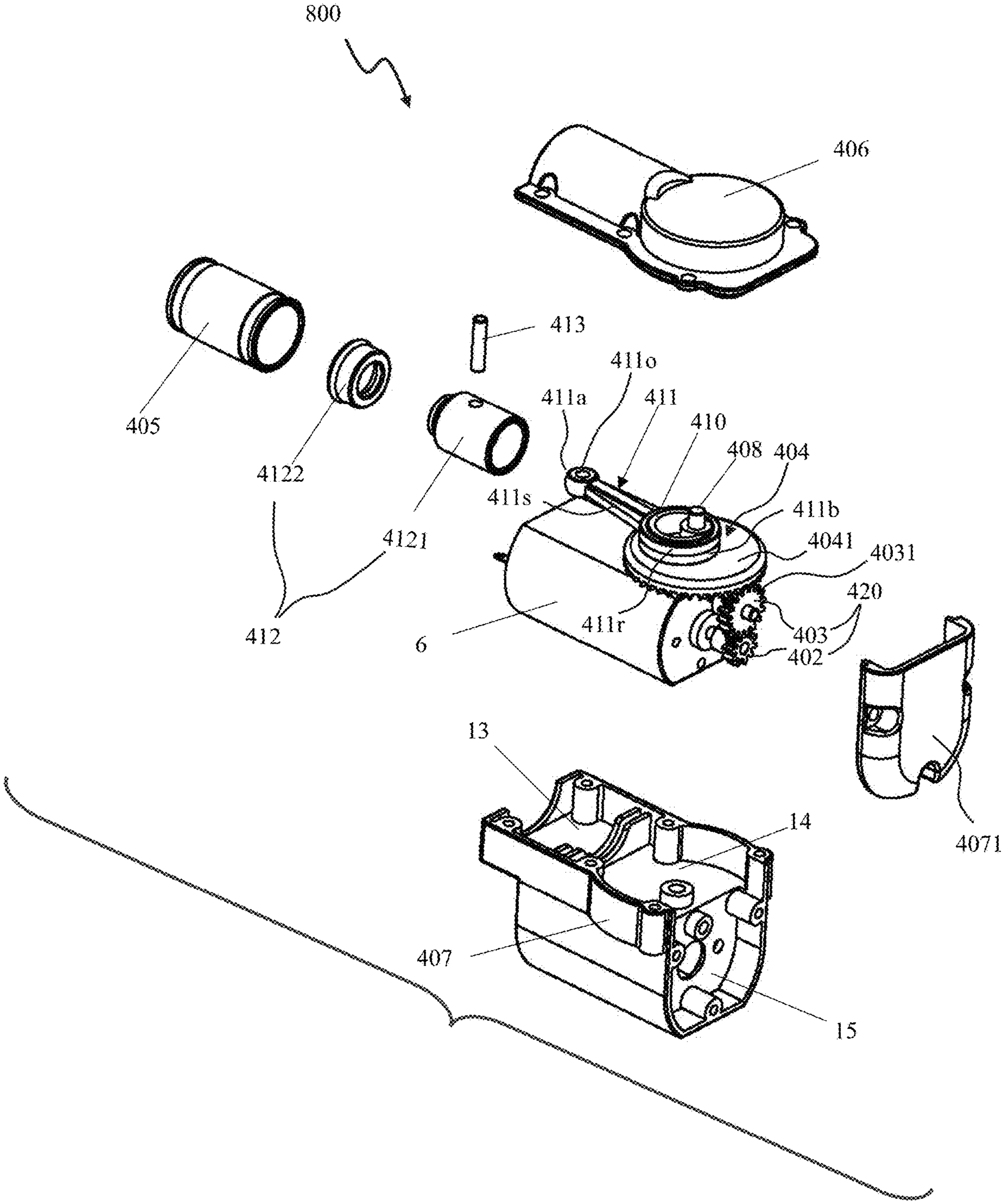
FIG. 4 is an exploded view of the partial structure of the massage device shown in FIG. 3.

As shown in FIGS. 3 and 4, for secure placement of the various components in the housing, the massage device also includes a first (or upper) fixation shell 406 and a second (or lower) fixation shell 407 which can be coupled to each other by screws or in other ways commonly known in the art. A first cavity 13 and a second cavity 14 are enclosed by the first fixation shell 406 and the second fixation shell 407. The guiding tube member 405 and a first part of the elongated shaft portion **411*s* of the link component 411 are disposed in the first cavity 13. The guiding tube member 405 is fixedly mounted between the first fixation shell 406 and the second fixation shell 407. A second part of the elongated shaft portion 411*s* and the circular portion of the 411*r* of the link component 411, as well as the eccentric wheel 404 are disposed in the second cavity 14. Enclosed by a third (rear) fixation shell 4071 and the second fixation shell 407, the third cavity 15 houses the gear assembly 420 that comprises a driving gear 402 and 403. The second fixation shell 407 also includes an internal void in which the motor 6** is tightly fitted.

The eccentric wheel 404 has a substantially flat major surface 4041 which is parallel with the long axis X1. On its reverse side, the eccentric wheel 404 has an outer edge with a substantially planar tooth pattern 4042, which meshes with a tooth pattern 4031 on a circumferential periphery on the driven gear 403, which rotates around its rotation shaft 409 and is coupled with a driving gear 402 mounted on an output shaft 61 of the motor 6. The shaft 409 defines a rotation axis X3 parallel to the axis X2 defined by the output shaft 61 of the motor 6. Collectively, the driving gear 402 and the driven gear 403 constitute gear assembly 420. The way the gear assembly 420, the eccentric wheel 404, and the transmission connection assembly 4 are connected converts the rotation motion of the motor 6 to the linear motion of the piston 412 such that the piston 412 moves linearly in a direction parallel to the rotation axis of the output shaft 61 of the motor 6.

To make the massage device compact in size, the components of the transmission connection assembly 4, e.g., the piston 412, the link component 411, and the eccentric wheel 404 are connected in series generally in a direction along the long axis X1 which is parallel to the rotational axis X2 of the electric motor 6. The motor is positioned side by side with the transmission connection assembly 4, and the output shaft 61 of the motor 6 extends in a direction away from the massage sleeve.

For good hand feel and skin contact experience, a jacket 1 made of an elastic material, such as silicone or other flexible and soft material, can be disposed and wrapped around the outside of the housing 100.

The massage sleeve 5 can be made from an elastic material such as silicone, or a hard material such as plastic or metal. The position of the massage sleeve 5 is not particularly limited. It can be positioned in the jacket 1 and coupled with the housing 100 as shown in the figures, or it can be integrally formed with the jacket 1 and extend into the housing 100. It may also protrude to the outside of the housing 100 and/or the jacket 1 so that it may contact a target human body part directly.

As shown in the figures, the transmission connection assembly 4, the gear assembly 420, and the motor 6 can all be housed or received in the housing 100.

As shown in the figures, the massage device can further include a battery holder 12 and a battery 7, where the battery holder 12 is positioned inside the upper casing 2 and fits with the upper casing 2. The battery 7 is fixedly positioned on the battery holder 12 and electrically coupled with a circuit board 8 to power the motor and electronic control components of the massage device. The circuit board 8 is also electrically coupled with the motor 6. The battery 7 can be a rechargeable battery.

The circuit board 8 includes an on-board controller 81 configured to control the operation of the motor (e.g., start, stop, rotation speed/pattern). A button 9 is connected to the controller for activating the controller. An elastic key 11 engages with button 9, and the rear cover 10 is provided with a through hole that corresponds to the elastic key 11 to allow the elastic key 11 to protrude outside the rear cover 10 for easy access by a user (e.g., by touching or pushing the key) to activate the controller to control the motor.

When in use, the opening 101 of the housing can be placed directly against a target skin surface of a human body (with the tip 1001 of the jacket 1 contacting the skin), e.g., the skin around a clitoris, to form an enclosed/sealed air chamber in the massage sleeve 5 and the lumen 4055 in the guiding tube member 405 bounded by the piston 412. When the motor 6 is powered on and activated, the rotation of the output shaft 61 along the central axis X2 of the motor 6 drives the driving gear 402, which in turn drives the driven gear 403, which in turn drives the eccentric wheel 404 to rotate along the shaft 408 (or axis Y1). The rotation of the top protrusion circular portion 410 of the eccentric wheel 404 causes the link component 411 to produce a crankshaft motion, driving the piston 412 to move inside the guiding tube member 405 axially back and forth along the long axis X1, thereby causing the air pressure in the massage sleeve to vary. This can create a massage or stimulation effect on the target part of the body, e.g., a clitoris, where the user can experience a sucking sensation by the varying air pressure. The massage effects can vary based on different movement speeds and patterns of the piston, which can be controlled by the controller.

The massage device of the present invention may further include at least one pair of one-way valves positioned on a barrier disposed between the massage sleeve and the piston. When the piston moves to the left, the first valve moves to the left and opens while the second valve remained closed;

and conversely, when the piston moves to the right, the second valve moves to the right and opens, while the first valve remains closed.

Although the present invention and its advantages have been described in detail, it should be understood that various changes, substitutions and alterations can be made without departing from the spirit and scope of the invention as defined by the appended claims. Furthermore, the scope of the present application is not limited to the specific embodiments of the apparatus, structure, processes, means, methods and steps described in the specification. Those of ordinary skill in the art will readily understand from the disclosure of the present invention that existing and existing devices that perform substantially the same functions or obtain substantially the same results as corresponding embodiments described herein may be used in accordance with the present invention. Accordingly, the appended claims are intended to include within their scope such processes, apparatus, means, methods or steps.

The invention claimed is:

1. A massage device, comprising:

(a) a housing;

(b) a massage sleeve having an opening;

(c) a transmission connection assembly including:

a guiding tube member, a piston movable axially inside the guiding tube member along a long axis, an eccentric wheel, and a link component having a first end coupled with the piston and a second end coupled with the eccentric wheel;

(d) a motor that is coupled with the eccentric wheel of the transmission connection assembly and includes an output shaft defining a shaft rotation axis which is parallel to the long axis, and when in operation, drives the piston via the transmission connection assembly to move axially inside the guiding tube member along the long axis to change air pressure in the massage sleeve, wherein the housing includes an opening at one end, the opening aligned with and in air communication with the opening of the massage sleeve, wherein the massage sleeve is arranged at an end of the guiding tube member of the transmission connection assembly and aligned coaxially with the guiding tube member, and wherein the transmission connection assembly and the motor are received inside the housing.

2. The massage device of claim 1, wherein an end of the piston has a cross section matching a cross-section of a lumen enclosed in the guiding tube member.

3. The massage device of claim 1, wherein the piston comprises a sealing cover coupled with a bottom of a plunging tube.

4. The massage device of claim 1, wherein the link component comprises an elongated shaft portion connected with a circular portion.

5. The massage device of claim 4, wherein the elongated shaft portion comprises an opening at an end which is coupled with the piston via a positioning pin.

6. The massage device of claim 4, wherein the circular portion is coupled with a top protruding circular section of the eccentric wheel.

7. The massage device of claim 4, wherein the eccentric wheel has a flat major face parallel with the long axis along which the piston is movable inside the guiding tube member.

8. The massage device of claim 7, wherein the eccentric wheel comprises a bottom edge comprising a first planar tooth pattern that meshes with a second tooth pattern on a circumferential periphery of a gear of a gear assembly driven by the motor.

9. The massage device of claim 8, wherein the gear assembly comprises a driving gear coupled with an output shaft of the motor, and a driven gear having the second tooth pattern on a circumferential periphery, the driven gear being coupled with and driven by the driving gear.

10. A massage device, comprising:

(a) a housing;

(b) a massage sleeve having an opening;

(c) a transmission connection assembly including:

a guiding tube member, a piston movable axially inside the guiding tube member along a long axis, an eccentric wheel, and a link component having a first end coupled with the piston and a second end coupled with the eccentric wheel;

(d) a motor that is coupled with the eccentric wheel of the transmission connection assembly and when in operation, drives the piston via the transmission connection assembly to move axially inside the guiding tube member along the long axis to change air pressure in the massage sleeve, wherein the housing includes an opening at one end, the opening aligned with and in air communication with the opening of the massage sleeve, wherein the link component comprises an elongated shaft portion connected with a circular portion, wherein the eccentric wheel has a flat major face parallel with the long axis, and comprises a bottom edge comprising a first planar tooth pattern that meshes with a second tooth pattern on a circumferential periphery of a gear of a gear assembly driven by the motor, wherein the massage sleeve is arranged at an end of the guiding tube member of the transmission connection assembly and aligned coaxially with the guiding tube member, and wherein the transmission connection assembly and the motor are received inside the housing.

11. The massage device of claim 10, wherein the gear assembly comprises a driving gear coupled with an output shaft of the motor, and a driven gear having the second tooth pattern on a circumferential periphery, the driven gear being coupled with and driven by the driving gear.

* * * * *